United States Patent
Rahman (10) Patent No.: US 12,034,889 B2
(45) Date of Patent: Jul. 9, 2024

(54) VOICE PACKETS OVER THE CONTROL PLANE

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 113 days.

(21) Appl. No.: 17/365,717

(22) Filed: Jul. 1, 2021

(65) Prior Publication Data

US 2023/0007128 A1    Jan. 5, 2023

(51) Int. Cl.
*H04M 7/12*    (2006.01)
*H04M 7/00*    (2006.01)
*H04W 28/02*    (2009.01)
*H04W 36/00*    (2009.01)
*H04W 76/12*    (2018.01)

(52) U.S. Cl.
CPC ........... *H04M 7/126* (2013.01); *H04M 7/006* (2013.01); *H04W 28/0268* (2013.01); *H04W 36/0022* (2013.01); *H04W 76/12* (2018.02)

(58) Field of Classification Search
CPC . H04M 7/126; H04M 7/006; H04W 28/0268; H04W 36/0022; H04W 76/12
See application file for complete search history.

(56) References Cited

U.S. PATENT DOCUMENTS

| | | | | |
|---|---|---|---|---|
| 2013/0010751 | A1* | 1/2013 | Rydnell | H04W 36/14 370/331 |
| 2014/0162676 | A1* | 6/2014 | Shaw | H04W 76/00 455/452.2 |
| 2014/0241321 | A1* | 8/2014 | Wong | H04L 65/1033 370/331 |
| 2015/0063310 | A1* | 3/2015 | Shi | H04L 65/1016 370/331 |

(Continued)

FOREIGN PATENT DOCUMENTS

EP    3409067 B1    6/2019

OTHER PUBLICATIONS

International Search Report and Written Opinion, by the ISA/KR, dated Oct. 25, 2022, regarding PCT Application No. PCT/US2022/036010 (7 pages).

*Primary Examiner* — Steven Hieu D Nguyen
(74) *Attorney, Agent, or Firm* — Foley IP Law, PLLC (57) ABSTRACT

Providing a voice call includes: receiving, from a user equipment (UE), a request to initiate a voice call traffic session; requesting setup of a voice call data pipe; based on at least a setup of the voice call data pipe not completing prior to a timer event, transmitting voice packets over a signaling data pipe; and based on at least the voice call data pipe setup completing, ceasing to transmit voice packets over the signaling data pipe and transmitting voice packets over the voice call data pipe. Placing a voice call includes: requesting, by the UE, to initiate the voice call traffic session; based on at least a first trigger event, transmitting voice packets over the signaling data pipe; and based on at least a second trigger event, ceasing to transmit voice packets over the signaling data pipe and transmitting voice packets over the voice call data pipe.

20 Claims, 6 Drawing Sheets

(56) References Cited

U.S. PATENT DOCUMENTS

| | | | |
|---|---|---|---|
| 2016/0073413 A1* | 3/2016 | Abrahams | H04W 72/543 |
| | | | 370/329 |
| 2016/0142931 A1 | 5/2016 | Mondal et al. | |
| 2016/0241321 A1* | 8/2016 | Agardh | H04B 7/0617 |
| 2019/0141772 A1 | 5/2019 | Chiang et al. | |
| 2019/0191329 A1* | 6/2019 | Gundavelli | H04W 76/22 |
| 2019/0387082 A1 | 12/2019 | Martinez-Heath et al. | |
| 2021/0045020 A1* | 2/2021 | Youtz | H04W 76/38 |
| 2021/0051552 A1 | 2/2021 | Chong et al. | |
| 2021/0068019 A1* | 3/2021 | Cuevas Ramirez | |
| | | | H04W 36/385 |
| 2022/0248278 A1* | 8/2022 | Huang | H04W 36/00837 |
| 2023/0007557 A1* | 1/2023 | Zhu | H04W 36/125 |

* cited by examiner

VOICE PACKETS OVER THE CONTROL PLANE

BACKGROUND

Cellular networks, such as fourth generation (4G) and fifth generation (5G) cellular networks, separate traffic into a control plane and a data plane. Generic data traffic, composed of packets, travels through the data plane and signaling traffic, also composed of packets, travels through the control plane. When a cellular device, such as a user equipment (UE), connects to a cellular network, two data pipes are typically set up. One is a data default bearer and one is an internet protocol (IP) multimedia system (IMS) default bearer. The IMS default bearer is used for session initiation protocol (SIP) signaling, which is used for setting up voice calls.

When a UE attempts to place a voice call, such as a voice over long term evolution (VoLTE) call in 4G, a voice over new radio (VoNR) call in 5G, or a voice over WiFi (VoWiFi) call, SIP signaling over the IMS default bearer in the control plane is used to set up an IMS dedicated bearer for a voice call data pipe. A new IMS dedicated bearer is needed for all new calls and call handover (e.g., a call is transferred from one cell to another cell or from one technology, such as VoLTE, VoNR, and VoWiFi, to another). If a new IMS dedicated bearer cannot be set up in time (e.g., 10 to 15 seconds) when a UE is attempting to place a new voice call, the call will be unsuccessful. If a new IMS dedicated bearer cannot be set up in time during a handover, the call will be dropped. Both scenarios degrade user experience.

SUMMARY

The following summary is provided to illustrate examples disclosed herein, but is not meant to limit all examples to any particular configuration or sequence of operations.

A solution for providing a voice call includes: receiving, from a user equipment (UE), a request to initiate a voice call traffic session; requesting setup of a voice call data pipe; based on at least a setup of the voice call data pipe not completing prior to a timer event, transmitting voice packets over a signaling data pipe; and based on at least the voice call data pipe setup completing, ceasing to transmit voice packets over the signaling data pipe and transmitting voice packets over the voice call data pipe. Placing a voice call includes: requesting, by the UE, to initiate the voice call traffic session; based on at least a first trigger event, transmitting voice packets over the signaling data pipe; and based on at least a second trigger event, ceasing to transmit voice packets over the signaling data pipe and transmitting voice packets over the voice call data pipe.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for providing a voice call includes: receiving, from a user equipment (UE), a request to initiate a voice call traffic session; requesting setup of a voice call data pipe; based on at least a setup of the voice call data pipe not completing prior to a timer event, transmitting voice packets over a signaling data pipe; and based on at least the voice call data pipe setup completing, ceasing to transmit voice packets over the signaling data pipe and transmitting voice packets over the voice call data pipe. Placing a voice call includes: requesting, by the UE, to initiate the voice call traffic session; based on at least a first trigger event, transmitting voice packets over the signaling data pipe; and based on at least a second trigger event, ceasing to transmit voice packets over the signaling data pipe and transmitting voice packets over the voice call data pipe.

In some examples, the request to initiate a voice call traffic session comprises a new voice call traffic session, which may be a voice over long term evolution (VoLTE) call in a fourth generation (4G) cellular network, a voice over new radio (VoNR) call in a fifth generation (5G) cellular network, or a voice over WiFi (VoWiFi) call. In some examples, the request to initiate a voice call traffic session comprises a handover of an existing voice call traffic session (e.g., any of VoNR, VoLTE, and VoWiFi) to a handover voice call traffic session (e.g., any of VoNR, VoLTE, and VoWiFi). In some examples, the voice call data pipe comprises an internet protocol (IP) multimedia system (IMS) dedicated bearer, which may be a quality of service (QoS) class identifier (QCI) 1 bearer in 4G or a 5G QoS identifier (5QI) 5 bearer in 5G (a QCI-1 bearer or a 5QI-1 bearer). In some examples, the signaling data pipe comprises an IMS default bearer, which may be a QCI-5 bearer in 4G or a 5QI-5 bearer in 5G.

In some examples, the first trigger event comprises receiving an instruction, by the UE, from the wireless network, to transmit voice packets over the signaling data pipe, whereas in some other examples, the first trigger event comprises a setup of the voice call data pipe not completing prior to a timer event. That is, the UE may either transmit voice packets over the signaling data pipe upon instruction from the network or upon its own determination that the voice call data pipe did not complete prior to the timer event. In some examples, the second trigger event comprises receiving an instruction, by the UE, from the wireless network, to transmit voice packets over the voice call data pipe, whereas in some other examples, the second trigger event comprises a setup of the voice call data pipe completing. That is, the UE may either cease transmitting voice packets over the signaling data pipe upon instruction from the network or upon its own determination that the voice call data pipe setup completed.

Aspects of the disclosure improve the speed and reliability of cellular communications by transmitting voice packets over a signaling data pipe, and based on at least the voice call data pipe setup completing, ceasing to transmit voice packets over the signaling data pipe and transmitting voice packets over the voice call data pipe. This operation provides multiple advantages. Whereas, previously, the caller needed to wait for the voice call data pipe to complete setting up before the caller could begin speaking with the distant party (e.g., the voice call began), aspects of the disclosure insulate the caller from at least some delays in setting up the voice call data pipe for new calls and/or handovers.

Insulating the caller from delays in setting up the voice call data pipe for new calls, permits the caller to begin speaking with the distant party sooner, and may also reduce the number of call failures. This is because the timer for failing a call setup attempt while the user is waiting may be shorter than if the call had already begun (by using the signaling data pipe). The extended allowable time delay for setting up the voice call data pipe may permit a larger number of calls to proceed. Insulating the caller from delays in setting up the voice call data pipe for handovers reduces the number of calls dropped during handovers, because the voice call is not interrupted by a delay in setting up the voice call data pipe through the new cell. Thus multiple advantageous improvements in speed and reliability become available.

Aspects of the disclosure address intelligently employing this capability by balancing the advantageous use with the risk of overly burdening the control plane. In some examples, one or more timers are employed to trigger the use of the control plane for transmitting voice packets only after a sufficient delay in setting up the voice call data pipe.

Figure 1:
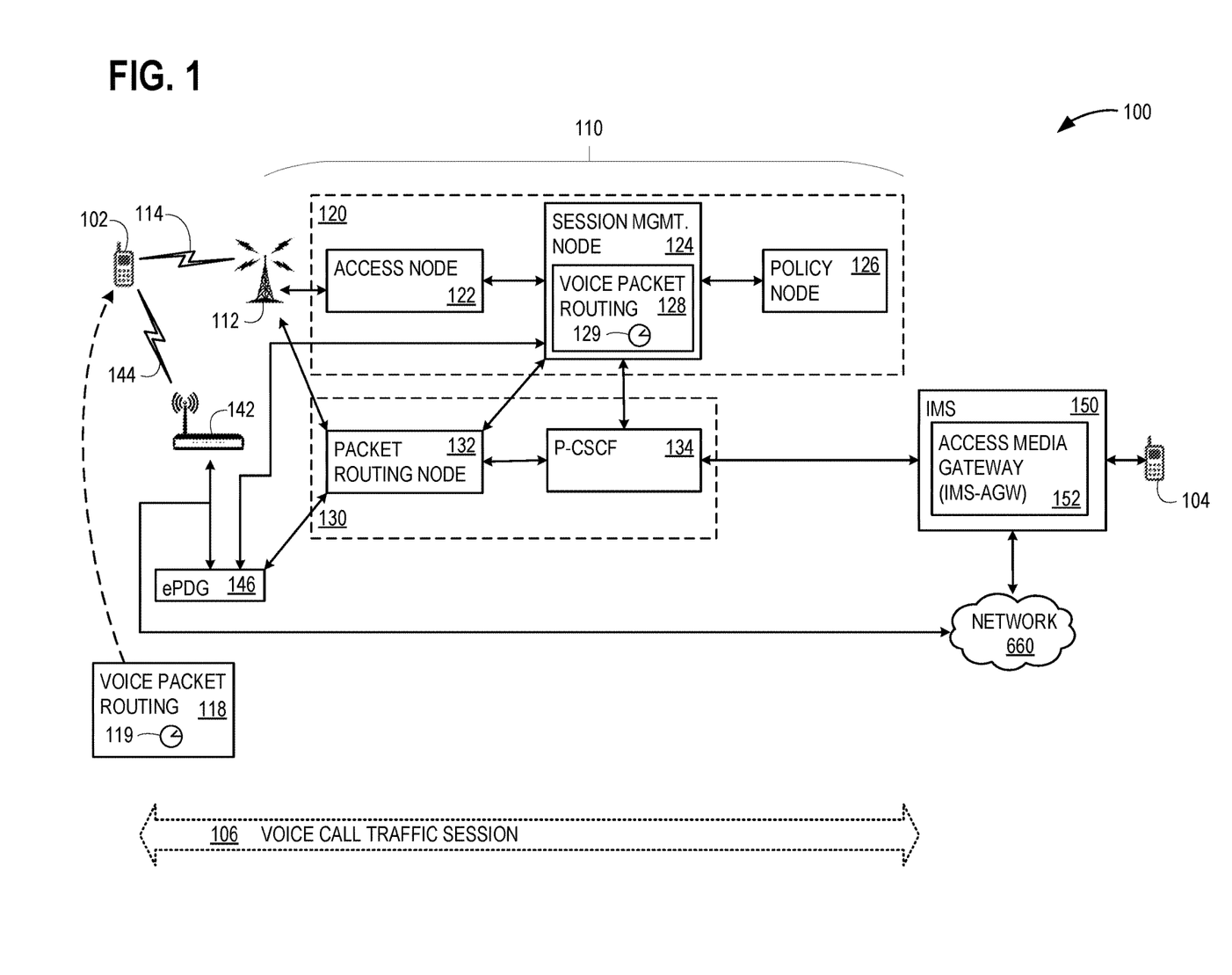
FIG. 1 illustrates an exemplary arrangement that advantageously permits transmitting voice packets over the control plane, in order to improve user experience.

With reference now to the figures, FIG. 1 illustrates an arrangement 100 that advantageously permits a UE 102 to transmit voice packets over a control plane 120 of a (cellular) wireless network 110. UE 102 communicates with a serving base station 112 over an air interface 114. Base station 112 is part of wireless network 110, which comprises control plane 120 and a user plane 130. Control plane 120 comprises an access node 122, a session management node 124, and a policy node 126. User plane 130 comprises a packet routing node 132, and a proxy call session control function (P-CSCF) 134. An evolved packet data gateway (ePDG) 146 interfaces with IP systems that are not trusted by wireless network 110, such as a WiFi router 142. As illustrated, ePDG 146 communicates with elements of both control plane 120 and user plane 130.

For 4G, access node 122 may comprise a mobility management entity (MME), session management node 124 may comprise a packet data network gateway (PGW) control plane function (PGW-C) and a serving gateway (SGW) control plane function (SGW-C), policy node 126 may comprise a policy and charging rules function (PCRF), and packet routing node 132 may comprise a PGW user plane function (PGW-U) and an SGW user plane function (SGW-U). For 5G, access node 122 may comprise an access and mobility management function (AMF), session management node 124 may comprise a session management function (SMF), policy node 126 may comprise a policy control function (PCF), and packet routing node 132 may comprise a user plane function (UPF).

Arrangement 100 enables UE 102 to place a voice call, using a voice call traffic session 106, to a UE 104. For 4G (VoLTE) and 5G (VoNR) the route for voice packets (voice data packets for voice calls) passes from UE 104 over air interface 114, through base station 112, user plane 130 (e.g., packet routing node 132 and P-CSCF 134), and an IMS 150, which includes an IMS access gateway (IMS-AGW 152) to UE 104. For 4G and 5G signaling to set up voice call traffic session 106 for the voice call passes from UE 104 over air interface 114, through base station 112 to control plane 120, specifically through access node 122 to session management node 124. However, as illustrated, session management node 124 is communicatively coupled to elements within user plane 130. This is so that session management node 124 is able to instruct packet routing node 132 and P-CSCF 134 to assign and release resources. This connectivity provides a path for voice packets through control plane 120 to IMS 150 (and thus to UE 104) that is parallel to the path through user plane 130.

For VoWiFi, different options exist. For managed VoWiFi, the route for voice packets passes from UE 104 over an air interface 144, through WiFi router 142, user plane 130, and IMS 150 to UE 104. Also for managed VoWiFi, signaling to set up voice call traffic session 106 for the voice call passes from UE 104 over air interface 144, through WiFi router 142, and into control plane 120. Unmanaged VoWiFi, however, passes from wireless network 110 through a network 660, which is described in further detail in relation to FIG. 6, to IMS 150, outside of wireless network 110.

A voice packet routing component 128, which manages the transmission of voice packets by wireless network 110, is illustrated within control plane 120 and is described in further detail in relation to the following figures. Voice packet routing component 128 is illustrated as having a timer 129 and being located within session management node 124, although voice packet routing component 128 may be located elsewhere within control plane 120, in some examples. A voice packet routing component 118 within UE 102 manages the transmission of voice packets by UE 102 using a timer 119, and is also described in further detail in relation to the following figures.

Figure 2:
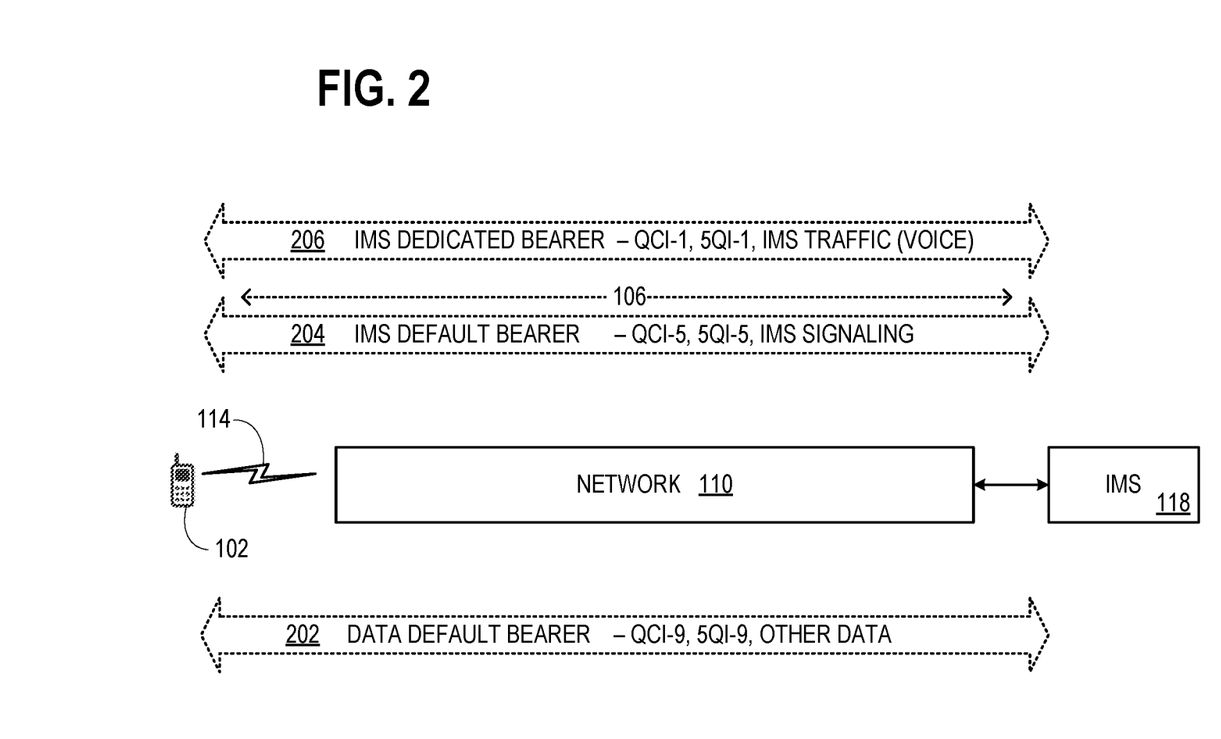
FIG. 2 illustrates exemplary data pipes used in the arrangement of FIG. 1.

FIG. 2 illustrates exemplary data pipes 202, 204, and 206, used in arrangement 100. When UE 102 connects to wireless network 110, general data pipe 202 is set up as a data default bearer, as a QCI-9 bearer in 4G or a 5QI-9 bearer in 5G. General data pipe 202 is used for generic data (e.g., streaming video) and is a non-guaranteed bit rate (non-GBR) bearer with an allowance for a 100 millisecond (ms) packet delay and a 1/1,000,000 packet loss rate. Also, after UE 102 connects to wireless network 110, signaling data pipe 204 is set up as an IMS default bearer, as a QCI-5 bearer in 4G or a 5QI-5 bearer in 5G. Signaling data pipe 204 is used for IMS signaling, such as session initiation protocol (SIP) signaling that is used for setting up voice call traffic session 106. Signaling data pipe 204 is also a non-GBR bearer with an allowance for a 100 ms packet delay and a 1/1,000,000 packet loss rate. However, whereas packets in generic data pipe 202 have a priority of 9, packets in signaling data pipe 204 have a priority of 1 (highest priority). Typically, default bearers (e.g., general data pipes 202 and signaling data pipe 204) remain active while UE 102 remains attached to wireless network 110, and each has its own IP address.

In typical voice call scenarios, when UE 102 sends the SIP signaling to wireless network 110, a voice call data pipe 206 is set up to transmit voice packets of voice call traffic session 106, and released when voice call traffic session 106 ends (or is replaced by another data pipe 206 during a handover). Voice call data pipe 206 is set up as an IMS dedicated bearer, as a QCI-1 bearer in 4G or a 5QI-1 bearer in 5G. Voice call data pipe 206 is a guaranteed bit rate (GBR) bearer with an allowance for a 100 ms packet delay and a 1/100 packet loss rate with a priority of 2 (second highest priority). A dedicated bearer is linked to a default bearer to provide a dedicated tunnel for specific traffic (e.g., voice traffic) and share the same IP address.

When UE 102 sends a request to initiate voice call traffic session 106 to wireless network 110 (specifically to session management node 124), setup of voice call data pipe 206 may take time or may require multiple attempts. It is during this delay period that voice packet routing component 128 transmits voice packets over signaling data pipe 204 for downlink traffic (to UE 102) and voice packet routing component 118 controls UE 102 to transmit voice packets over signaling data pipe 204 for uplink traffic (from UE 102). Different schemes may be used to manage this behavior. Either voice packet routing component 118 may determine that setup of voice call data pipe 206 has not completed, and begin using signaling data pipe 204 without instruction from wireless network 110, or voice packet routing component 118 may wait for an instruction from wireless network 110 (thereby waiting for permission from wireless network 110 to use signaling data pipe 204 for voice traffic).

Voice call data pipe 206, the typical data pipe used for voice packets, has a lower priority and permits a higher error (or packet loss) rate than signaling data pipe 204. Thus, overuse of signaling data pipe 204 for voice traffic places a high burden on wireless network 110. Timer 119 in voice packet routing component 118 and timer 129 in voice packet routing component 118 provide for a minimum wait time before the use of signaling data pipe 204 for voice traffic, so that short delays in setting up voice call data pipe 206 do not trigger the use of signaling data pipe 204 for voice traffic. This saves the use of signaling data pipe 204 for voice traffic for scenarios that impact users more significantly, such as when a voice call setup may fail or a voice call may drop during handover.

Figure 3:
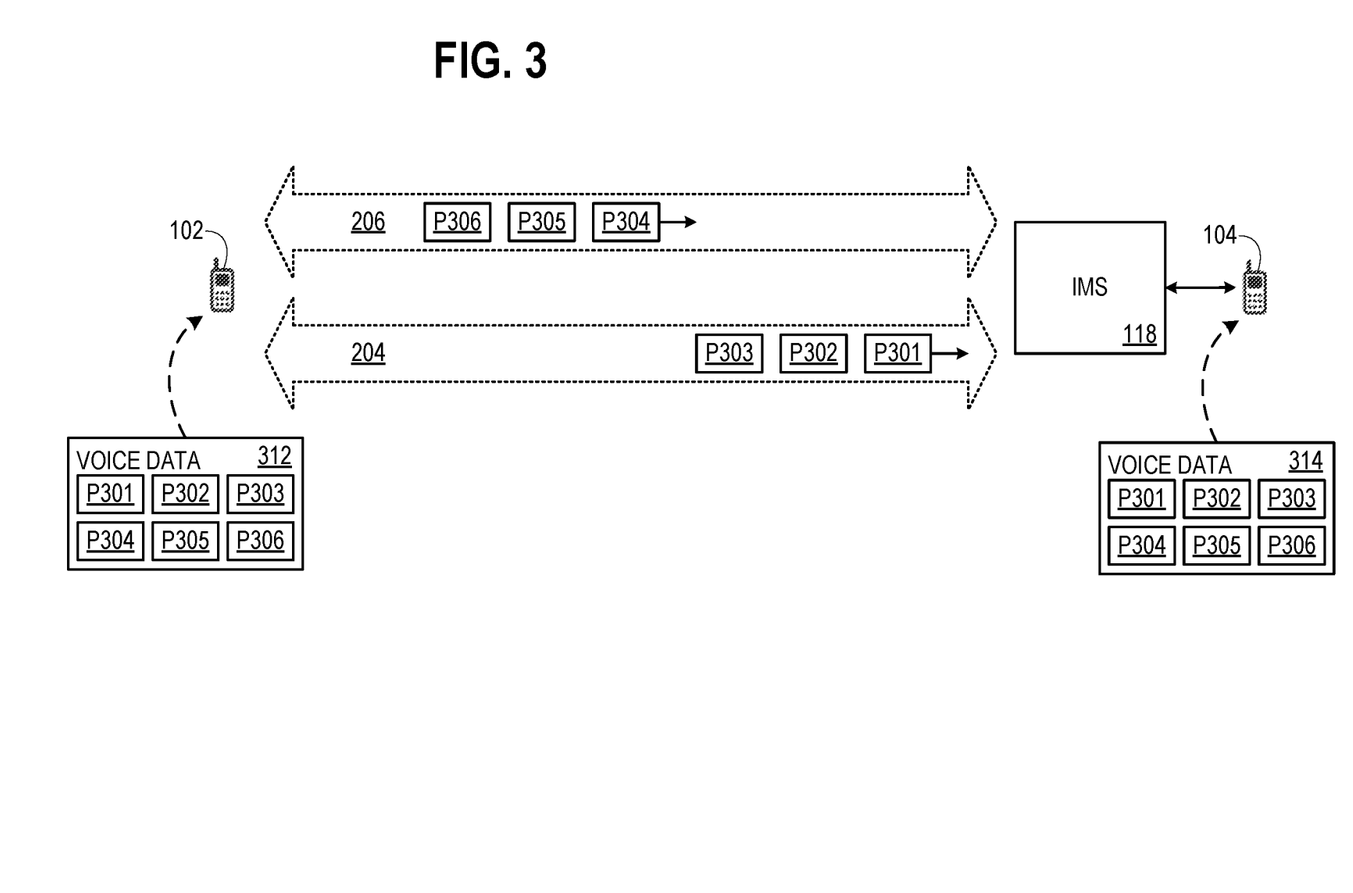
FIG. 3 illustrates the transmission of voice packets over each of a signaling data pipe and a voice call data pipe, as may occur in the arrangement of FIG. 1.

FIG. 3 illustrates the transmission of voice packets P301-P303 over signaling data pipe 204 and the transmission of voice packets P304-P306 over voice call data pipe 206. At UE 102, as the user speaks, the captured audio signal is digitized as voice data 312 and organized into voice packets P301-P306. Voice packets P301-P306 are transmitted to UE 104 using a real-time transport protocol (RTP) and reassembled into voice data 314 to be played as an audio signal to the user of UE 104.

Voice packet P301, voice packet P302, and voice packet P303 are transmitted over signaling data pipe 204 prior to the availability of voice call data pipe 206. UE 102 continues attempting to set up voice call data pipe 206 (in the background, while the user is on the voice call). When voice call data pipe 206 becomes available, as determined by the modem of UE 102, UE 102 ceases to transmit voice packets over signaling data pipe 204 and begins transmitting voice packets over voice call data pipe 206, in order to reduce the burden on wireless network 110. Thus, voice packet P304, voice packet P305, and voice packet P306 are transmitted over voice call data pipe 206.

Figure 4:
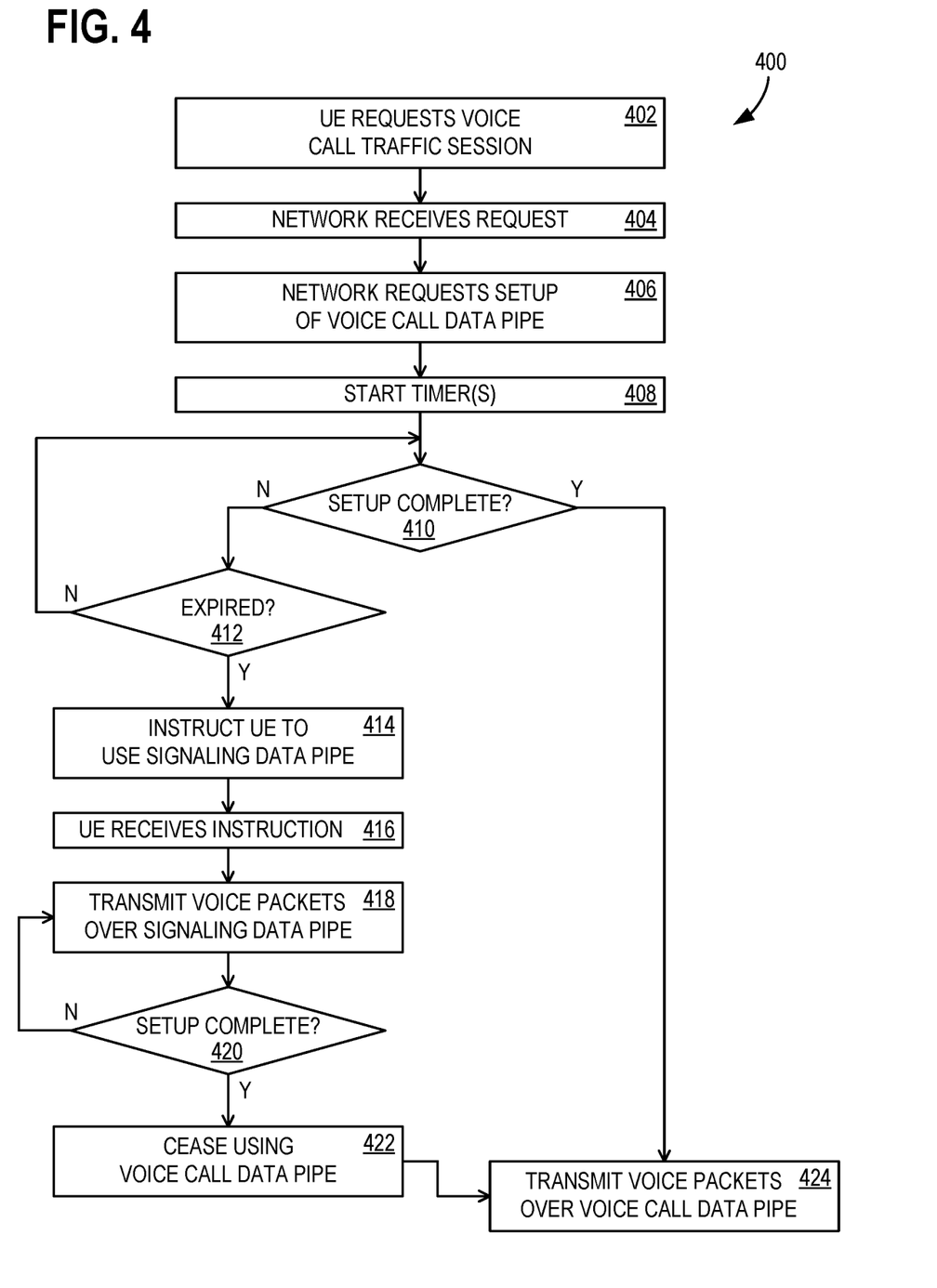
FIG. 4 illustrates a flowcharts of exemplary operations associated with transmitting voice packets over the control plane, as may occur in the arrangement of FIG. 1.

FIG. 4A illustrates a flowchart 400 of exemplary operations associated with providing a voice call over wireless network 110 and placing a voice call, by UE 102, over wireless network. In some examples, at least a portion of flowchart 400 may be performed using one or more computing devices 600 of FIG. 6 (e.g., UE 102 and elements of both control plane 120 and user plane 130 may be examples of computing device 600).

Flowchart 400 commences with operation 402, which includes requesting, by UE 102, to initiate voice call traffic session 106 using signaling data pipe 204. In some examples, signaling data pipe 204 comprises an IMS default bearer. In some examples, signaling data pipe 204 comprises a QCI-5 bearer or a 5QI-5 bearer. In some examples, the request to initiate voice call traffic session 106 comprises a SIP request for a new voice call traffic session. In some examples, the request to initiate voice call traffic session 106 a request to initiate a VoNR, VoLTE, and VoWiFi call. In some examples, the request to initiate a voice call traffic session 106 a handover of an existing voice call traffic session to a handover voice call traffic session. In some examples, the existing voice call traffic session comprises a voice call type selected from the list consisting of: VoNR, VoLTE, and VoWiFi and the handover voice call traffic session comprises a voice call type selected from the list consisting of: VoNR, VoLTE, and VoWiFi.

Operation 404 includes receiving, from UE 102, by wireless network 110, the request to initiate voice call traffic session 106. Operation 406 includes requesting (by wireless network 110) setup of voice call data pipe 206. In some examples, voice call data pipe 206 comprises an IMS dedicated bearer. In some examples, voice call data pipe 206 comprises a QCI-1 bearer or a 5QI-1 bearer. In some examples, wireless network 110 requests (instructs) UE 102 to set up voice call data pipe 206.

Timer 119 and/or timer 129 are started in operation 408, and decision operation 410 determines whether setup of voice call data pipe 206 is complete. If not, flowchart 400 moves to decision operation 412 to determine whether a timer (e.g., timer 119 and/or timer 129) has expired. If not, flowchart 400 returns to decision operation 410. If the setup of voice call data pipe 206 completes prior to a timer event (e.g., the expiration of timer 119 and/or timer 129), flowchart 400 moves to operation 424, and voice packets (e.g., voice packets P301-P306) are transmitted over voice call data pipe 206.

Otherwise, if timer 119 and/or timer 129 expires prior to the setup of voice call data pipe 206 completing, flowchart 400 moves to operation 414. Operation 414 includes wireless network 110 instructing UE 102 to transmit voice packets over signaling data pipe 204. UE 102 receives the instruction, from wireless network 110, to transmit voice packets over voice call data pipe 206 in operation 416. UE 102 transmits voice packets over signaling data pipe 204 in operation 418.

Operation 418 may be implemented with various options. For the downlink (e.g., wireless network 110 transmitting to UE 102), wireless network 110 does not require permission from UE 102, and so operation 418 includes, based on at least a setup of voice call data pipe 206 not completing prior to a timer event, transmitting voice packets over signaling data pipe 204. For the uplink, however, in some examples, UE 102 may require permission from wireless network 110 to use signaling data pipe 204 for voice packets. For the uplink, operation 418 includes, based on at least a first trigger event, transmitting voice packets over signaling data pipe 204.

In examples in which UE 102 requires permission from wireless network 110 to use signaling data pipe 204 for voice packets, the first trigger event comprises receiving an instruction, by UE 102, from wireless network 110, to transmit voice packets (e.g., voice packets P301-P303) over signaling data pipe 204. This may be the result of timer 129 expiring. In examples in which UE 102 requires permission from wireless network 110 to use signaling data pipe 204 for voice packets, the first trigger event comprises a setup of voice call data pipe 206 not completing prior to a timer event (e.g., timer 119 expiring), as determined by UE 102.

As operation 418 proceeds, decision operation 420 determines whether the setup of voice call data pipe 206 has completed. If not, operation 418 continues. However, when voice call data pipe 206 does complete, flowchart 400 moves to operation 422 and the transmission of voice packets over signaling data pipe 204 ceases. In some examples, wireless network 110 sends UE an instruction to transmit voice packets over voice call data pipe 206. Flowchart 400 then moves to operation 424 and voice packets (e.g., voice packets P304-P306) are transmitted over voice call data pipe 206.

In some examples, operation 422 and 424 together include, based on at least voice call data pipe 206 setup completing, ceasing to transmit voice packets over signaling data pipe 204 and transmitting voice packets over voice call data pipe 206. In some examples, operation 422 and 424 together include, based on at least a second trigger event, ceasing to transmit voice packets over signaling data pipe 204 and transmitting voice packets over voice call data pipe 206. In some examples, the second trigger event comprises receiving an instruction, by UE 102, from wireless network 110, to transmit voice packets over voice call data pipe 206. In some examples, the second trigger event comprises a setup of voice call data pipe 206 completing, as determined by UE 102.

Figure 5A:
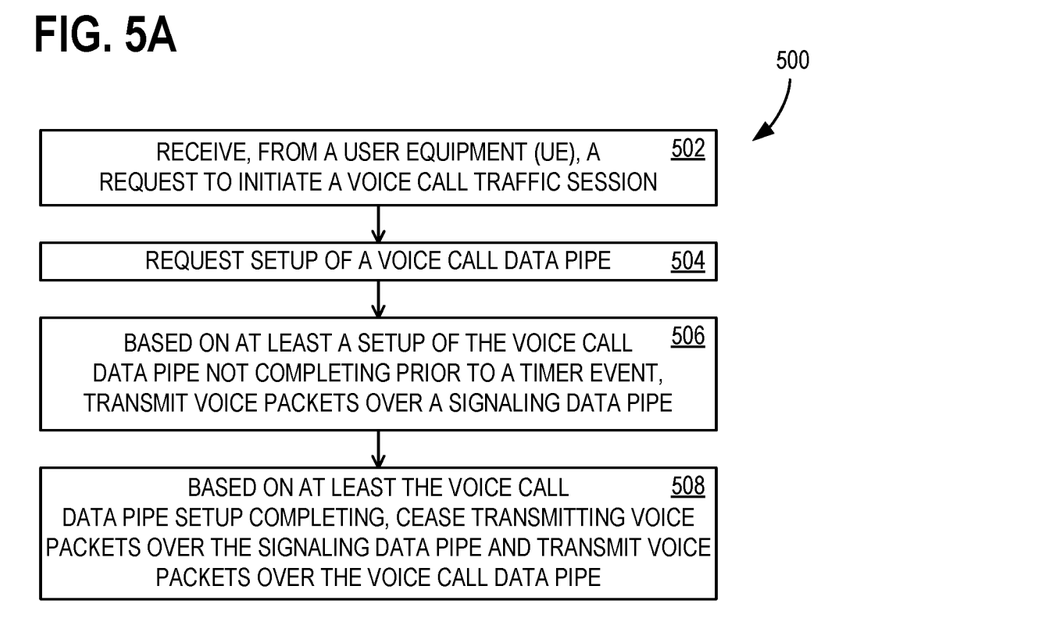
FIGS. 5A and 5B illustrates additional flowcharts of exemplary operations associated with transmitting voice packets over the control plane, as may occur in the arrangement of FIG. 1.

FIG. 5A illustrates a flowchart 500 of exemplary operations associated with examples of arrangement 100. In some examples, at least a portion of flowchart 500 may be performed using one or more computing devices 600 of FIG. 6. Flowchart 500 commences with operation 502, which includes receiving, from a UE, a request to initiate a voice call traffic session. Operation 504 includes requesting setup of a voice call data pipe. Operation 506 includes, based on at least a setup of the voice call data pipe not completing prior to a timer event, transmitting voice packets over a signaling data pipe. Operation 508 includes, based on at least the voice call data pipe setup completing, ceasing to transmit voice packets over the signaling data pipe and transmitting voice packets over the voice call data pipe.

Figure 5B:
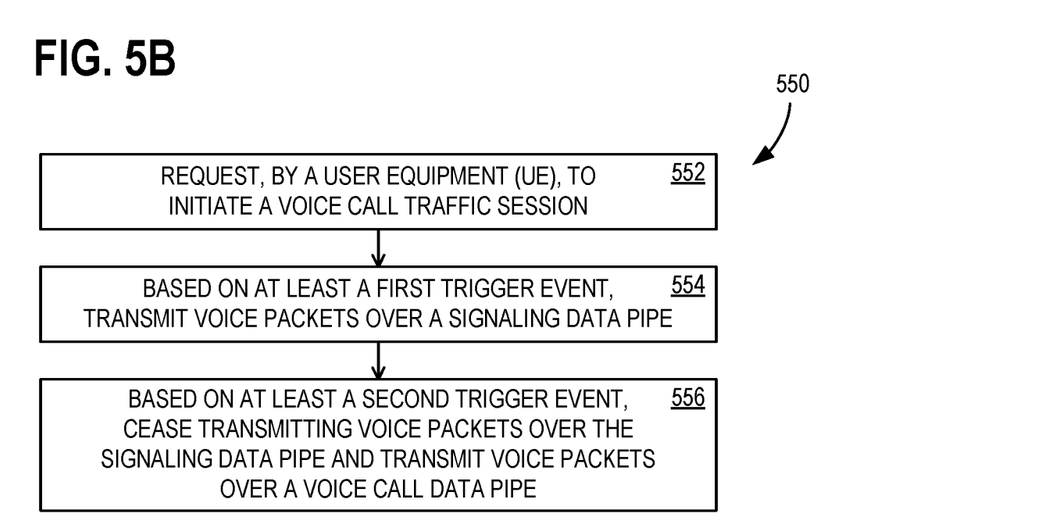

FIG. 5B illustrates a flowchart 550 of exemplary operations associated with examples of arrangement 100. In some examples, at least a portion of flowchart 550 may be performed using one or more computing devices 600 of FIG. 6. Flowchart 550 commences with operation 552, which includes requesting, by a UE, to initiate a voice call traffic session. Operation 554 includes, based on at least a first trigger event, transmitting voice packets over a signaling data pipe. Operation 556 includes, based on at least a second trigger event, ceasing to transmit voice packets over the signaling data pipe and transmitting voice packets over a voice call data pipe.

Figure 6:
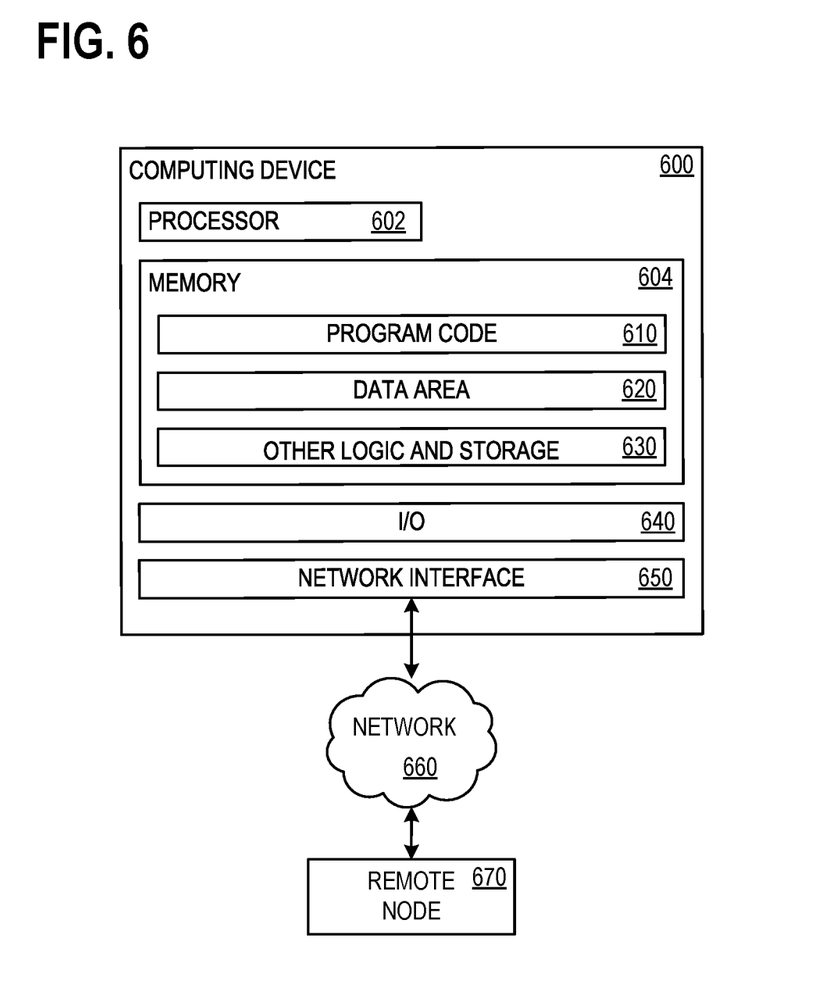
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600. For example, a remote node 670 may represent another of the above-noted nodes within arrangement 100.

Additional Examples

An example method of providing a voice call over a wireless network comprises: receiving, from a UE, a request to initiate a voice call traffic session; requesting setup of a voice call data pipe; based on at least a setup of the voice call data pipe not completing prior to a timer event, transmitting voice packets over a signaling data pipe; and based on at least the voice call data pipe setup completing, ceasing to transmit voice packets over the signaling data pipe and transmitting voice packets over the voice call data pipe.

An example method of placing a voice call over a wireless network comprises: requesting, by a UE, to initiate a voice call traffic session; based on at least a first trigger event, transmitting voice packets over a signaling data pipe; and based on at least a second trigger event, ceasing to transmit voice packets over the signaling data pipe and transmitting voice packets over a voice call data pipe.

An example system for providing a voice call over a wireless network comprises: a processor; and a computer-readable medium storing instructions that are operative upon execution by the processor to: receive, from a UE, a request to initiate a voice call traffic session; request setup of a voice call data pipe; based on at least a setup of the voice call data pipe not completing prior to a timer event, transmit voice packets over a signaling data pipe; and based on at least the voice call data pipe setup completing, cease transmitting voice packets over the signaling data pipe and transmit voice packets over the voice call data pipe.

An example system for placing a voice call over a wireless network comprises: a processor; and a computer-readable medium storing instructions that are operative upon execution by the processor to: request, by a UE, to initiate a voice call traffic session; based on at least a first trigger event, transmit voice packets over a signaling data pipe; and based on at least a second trigger event, cease transmitting voice packets over the signaling data pipe and transmit voice packets over a voice call data pipe.

One or more example computer storage devices has computer-executable instructions stored thereon, which, upon execution by a computer, cause the computer to perform operations comprising: receiving, from a UE, a request to initiate a voice call traffic session; requesting setup of a voice call data pipe; based on at least a setup of the voice call data pipe not completing prior to a timer event, transmitting voice packets over a signaling data pipe; and based on at least the voice call data pipe setup completing, ceasing to transmit voice packets over the signaling data pipe and transmitting voice packets over the voice call data pipe.

One or more example computer storage devices has computer-executable instructions stored thereon, which, upon execution by a computer, cause the computer to perform operations comprising: requesting, by a UE, to initiate a voice call traffic session; based on at least a first trigger event, transmitting voice packets over a signaling data pipe; and based on at least a second trigger event, ceasing to transmit voice packets over the signaling data pipe and transmitting voice packets over a voice call data pipe.

Alternatively, or in addition to the other examples described herein, examples include any combination of the following:

the request to initiate the voice call traffic session comprises a request to initiate a VoNR, VoLTE, and VoWiFi call;
the voice call data pipe comprises a QCI-1 bearer or 5QI-1 bearer;
the signaling data pipe comprises a QCI-5 bearer or 5QI-5 bearer;
the request to initiate a voice call traffic session comprises a new voice call traffic session;
the request to initiate a voice call traffic session comprises a handover of an existing voice call traffic session to a handover voice call traffic session;
the existing voice call traffic session comprises a voice call type selected from the list consisting of: VoNR, VoLTE, and VoWiFi;
the handover voice call traffic session comprises a voice call type selected from the list consisting of: VoNR, VoLTE, and VoWiFi;
the voice call data pipe comprises an IMS dedicated bearer;
the signaling data pipe comprises an IMS default bearer;
the first trigger event comprises receiving an instruction, from the wireless network, to transmit voice packets over the signaling data pipe;
the first trigger event comprises a setup of the voice call data pipe not completing prior to a timer event;
instructing the UE, by the wireless network, to transmit voice packets over the signaling data pipe;
the second trigger event comprises receiving an instruction, from the wireless network, to transmit voice packets over the voice call data pipe; and
the second trigger event comprises a setup of the voice call data pipe completing.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a voice call over a wireless network, the method comprising:
   receiving, from a user equipment (UE), a request to initiate a voice call traffic session;
   requesting setup of a voice call data pipe for communicating voice packets of the voice call traffic session;
   starting a timer in response to requesting setup of the voice call data pipe;
   determining that setup of the voice call data pipe has not been completed prior to expiration of the timer;
   based on determining that the setup of the voice call data pipe has not been completed prior to expiration of the timer, transmitting voice packets over a signaling data pipe, wherein the signaling data pipe is a bearer in fifth generation (5G) and the voice packets in the signaling data pipe have a highest priority of 1, and wherein the voice packets are not transmitted over either of the signaling data pipe and the voice call data pipe prior to expiration of the timer; and
   based on at least the voice call data pipe setup completing, ceasing to transmit the voice packets over the signaling data pipe and transmitting the voice packets over the voice call data pipe.

2. The method of claim 1, wherein the voice call data pipe comprises a quality of service (QoS) class identifier (QCI) 1 bearer or a 5G QoS identifier (5QI) 1 bearer.

3. The method of claim 1, wherein the signaling data pipe comprises a 5G QoS identifier (5QI) 5 bearer.

4. The method of claim 1, wherein the request to initiate the voice call traffic session comprises a new voice call traffic session.

5. The method of claim 1, wherein the request to initiate the voice call traffic session comprises a handover of an existing voice call traffic session to a handover voice call traffic session.

6. The method of claim 5, wherein the existing voice call traffic session comprises a voice call type selected from the list consisting of:
   voice over new radio (VoNR), voice over long term evolution (VoLTE), and voice over WiFi (VoWiFi); and
   wherein the handover voice call traffic session comprises a voice call type selected from the list consisting of: VoNR, VoLTE, and VoWiFi.

7. The method of claim 1, wherein the voice call data pipe comprises an internet protocol (IP) multimedia system (IMS) dedicated bearer, and the signaling data pipe comprises an IMS default bearer.

8. A system for providing a voice call over a wireless network, the system comprising:
   a processor; and
   a computer-readable medium storing instructions that are operative upon execution by the processor to:
   receive, from a user equipment (UE), a request to initiate a voice call traffic session;
   request setup of a voice call data pipe for communicating voice packets of the voice call traffic session;
   start a timer in response to requesting setup of the voice call data pipe;

determine that setup of the voice call data pipe has not been completed prior to expiration of the timer;

based on determining that the setup of the voice call data pipe has not been completed prior to expiration of the timer, transmit voice packets over a signaling data pipe, wherein the signaling data pipe is a bearer in fifth generation (5G) and the voice packets in the signaling data pipe have a highest priority of 1, and wherein the voice packets are not transmitted over either of the signaling data pipe and the voice call data pipe prior to expiration of the timer; and based on at least the voice call data pipe setup completing, cease to transmit the voice packets over the signaling data pipe and transmit the voice packets over the voice call data pipe.

9. The system of claim 8, wherein the voice call data pipe comprises a quality of service (QoS) class identifier (QCI) 1 bearer or a 5G QoS identifier (5QI) 1 bearer.

10. The system of claim 8, wherein the signaling data pipe comprises a 5G QoS identifier (5QI) 5 bearer.

11. The system of claim 8, wherein the request to initiate the voice call traffic session comprises a new voice call traffic session.

12. The system of claim 8, wherein the request to initiate the voice call traffic session comprises a handover of an existing voice call traffic session to a handover voice call traffic session.

13. The system of claim 12, wherein the existing voice call traffic session comprises a voice call type selected from the list consisting of:

voice over new radio (VoNR), voice over long term evolution (VoLTE), and voice over WiFi (VoWiFi); and wherein the handover voice call traffic session comprises a voice call type selected from the list consisting of: VoNR, VoLTE, and VoWiFi.

14. The system of claim 8, wherein the voice call data pipe comprises an internet protocol (IP) multimedia system (IMS) dedicated bearer, and the signaling data pipe comprises an IMS default bearer.

15. One or more computer storage devices having computer-executable instructions stored thereon, which, upon execution by a computer, cause the computer to perform operations comprising:

receiving, from a user equipment (UE), a request to initiate a voice call traffic session;

requesting setup of a voice call data pipe for communicating voice packets of the voice call traffic session;

starting a timer in response to requesting setup of the voice call data pipe;

determining that setup of the voice call data pipe has not been completed prior to expiration of the timer;

based on determining that the setup of the voice call data pipe has not been completed prior to expiration of the timer, transmitting voice packets over a signaling data pipe, wherein the signaling data pipe is a bearer in fifth generation (5G) and the voice packets in the signaling data pipe have a highest priority of 1, and wherein the voice packets are not transmitted over either of the signaling data pipe and the voice call data pipe prior to expiration of the timer; and based on at least the voice call data pipe setup completing, ceasing to transmit the voice packets over the signaling data pipe and transmitting the voice packets over the voice call data pipe.

16. The one or more computer storage devices of claim 15, wherein the voice call data pipe comprises a quality of service (QoS) class identifier (QCI) 1 bearer or a 5G QoS identifier (5QI) 1 bearer.

17. The one or more computer storage devices of claim 15, wherein the signaling data pipe comprises a 5G QoS identifier (5QI) 5 bearer.

18. The one or more computer storage devices of claim 15, wherein the request to initiate the voice call traffic session comprises a new voice call traffic session.

19. The one or more computer storage devices of claim 15, wherein the request to initiate the voice call traffic session comprises a handover of an existing voice call traffic session to a handover voice call traffic session.

20. The one or more computer storage devices of claim 19, wherein the existing voice call traffic session comprises a voice call type selected from the list consisting of:

voice over new radio (VoNR), voice over long term evolution (VoLTE), and voice over WiFi (VoWiFi); and wherein the handover voice call traffic session comprises a voice call type selected from the list consisting of: VoNR, VoLTE, and VoWiFi.

* * * * *